(12) United States Patent
Stata et al.

(10) Patent No.: US 6,353,925 B1
(45) Date of Patent: Mar. 5, 2002

(54) SYSTEM AND METHOD FOR LEXING AND PARSING PROGRAM ANNOTATIONS

(75) Inventors: Raymond Paul Stata, Palo Alto; Cormac Flanagan; K. Rustan M. Leino, both of Sunnyvale; Mark D. Lillibridge, Mountain View; James Benjamin Saxe, Palo Alto, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/401,615

(22) Filed: Sep. 22, 1999

(51) Int. Cl.[7] .................................................. G06F 9/45
(52) U.S. Cl. ............................................. 717/8; 704/9
(58) Field of Search ............................... 717/8, 5–7, 9; 704/9; 707/100–104

(56) References Cited

U.S. PATENT DOCUMENTS

| | | | | | |
|---|---|---|---|---|---|
| 5,259,766 A | * | 11/1993 | Sack et al. | ................... | 434/362 |
| 5,325,531 A | * | 6/1994 | McKeeman et al. | ........... | 717/8 |
| 5,487,000 A | * | 1/1996 | Takahashi et al. | .............. | 704/9 |
| 5,748,975 A | * | 5/1998 | Van De Vanter | ............ | 707/531 |
| 5,752,058 A | * | 5/1998 | Van De Vanter | ............ | 707/531 |
| 5,761,511 A | * | 6/1998 | Gibbons et al. | ................ | 717/5 |
| 5,768,564 A | * | 6/1998 | Andrews et al. | ................ | 717/5 |
| 5,813,019 A | * | 9/1998 | Van De Vanter | ............ | 707/512 |
| 5,857,212 A | * | 1/1999 | Van De Vanter | ............ | 707/519 |
| 6,021,286 A | * | 2/2000 | Kay | ............................... | 717/5 |
| 6,138,272 A | * | 10/2000 | Tonouchi | ........................ | 717/5 |
| 6,149,318 A | * | 11/2000 | Chase et al. | .................... | 717/4 |
| 6,182,281 B1 | * | 1/2001 | Nackman et al. | ............... | 717/5 |

OTHER PUBLICATIONS

Devanbu, Genoa—A Customizable, Front–End–Retargetable Source Code Analysis Framework, Apr. 1999, ACM, p. 177–212.*
Wile, Abstract Syntax from Concrete Syntax, 1997, ACM, P. 471–480.*
Blanche, Proof Nets for Controlling Ambiguity in Natural Language Processing, 1998, p. 459–465.*

* cited by examiner

Primary Examiner—Tuan Q. Dam
Assistant Examiner—John Q. Chavis
(74) Attorney, Agent, or Firm—Pennie & Edmonds LLP

(57) ABSTRACT

When a source program containing annotations is processed by a user-selected tool, the annotations in the source program are detected by a lexer and passed to an annotation processor corresponding to the selected tool. The system contains a number of annotation processors and a number of program processing tools, and the annotation processor to which the annotations are passed is selected based upon the user-selected tool. The selected annotation processor converts annotations compatible with the user-selected tool into annotation tokens and returns the annotation tokens to the lexer. The lexer generates tokens based upon the programming-language statements in the source program, and passes both the tokens and annotation tokens to a parser. The parser, in turn, assembles the tokens and annotation tokens into an abstract syntax tree, which is then passed to the user-selected tool for further processing.

12 Claims, 7 Drawing Sheets

SYSTEM AND METHOD FOR LEXING AND PARSING PROGRAM ANNOTATIONS

The present invention relates generally to compilers and program analyzers, and more particularly to an improved system and method for lexing and parsing computer programs that include tool-specific annotations.

BACKGROUND OF THE INVENTION

A compiler or a source-level program analyzer is capable of parsing source programs, which are written in a particular programming-language. Compilers generally include a lexer and a parser. Similarly, other types of programming tools include a lexer and parser. The lexer reads the source-level program and generates tokens based upon the programming-language statements in the source-level program. The lexer passes the generated tokens to the parser, which assembles the tokens into an abstract syntax tree (AST). The abstract syntax tree is further processed by one or more tools, such as a compiler back-end or a program correctness tester.

Tool specific annotations are typically used in the source program to give the tools special instructions; for example, "generate the following machine code instruction at this point in the target code," "generate code that uses a machine register for this program variable," "ignore possible errors of type x in this program statement," or "check that this parameter is always a non-zero integer." As new tools are devised, and as new features are added to those tools, the lexer and parser used by the tools will often require corresponding revisions.

The present invention addresses the problem of revising the lexer and parser for a programming-language when new tools are created, or new annotation-based features are added to tools. In particular, using the present invention, tool-specific annotations are effectively separated from programming-language-specific statements. Further, the present invention makes it relatively simple to implement a wide range of tool-specific annotations, including annotations that employ a complex programming-language.

Two conventional approaches that allow tool-specific annotations are known. In a first approach, tool-specific annotations are recognized and processed by the lexer. In a second approach, tool-specific annotations are recognized and processed by the parser.

An example of the first conventional approach to supporting tool-specific annotations is the way a "#line N" tool-specific annotation may be handled by a C compiler. There, the C compiler lexer may keep track of the line number information of every token it recognizes. If the C compiler lexer reads the "#line N" annotation, then the C compiler lexer changes an internal counter to N, as if the next line were N, and proceeds to read the next token. Since the lexical structure of the "#line N" is so simple, a standard lexer, such as the C compiler lexer, can recognize the tool-specific annotation.

An example of the second conventional approach to supporting tool-specific annotations in a compiler is the way a compiler for the Modula-3 language handles an "<* ASSERT P *>" tool-specific annotation. It is treated as if it were a Modula-3 program statement. Although "P" is an expression, it can be parsed appropriately because the annotation is recognized by the Modula-3 parser.

The conventional methods for recognizing tool-specific annotations, while functional, are less than satisfactory in practice. If a new tool (such as a type-checker or an error-checker) is created for a particular programming-language, extensive recoding of the standard programming-language lexer and parser may be required to handle program annotations specific to that tool. Even a simple modification made to the syntax of the annotations used by an existing tool may require extensive modification of the lexer and parser of that tool.

SUMMARY OF THE INVENTION

In the system and methods of the present invention, tool-specific annotations are recognized by the lexer for the programming-language, but the lexing and parsing of the tool-specific annotations are handled by a separate, tool-specific annotation processor.

A compiler or other programming tool includes a lexer capable of detecting computer programming-language units present in a character stream. The lexer generates a stream of tokens based upon these units. The lexer is further capable of detecting the units of computer programming-language statements such as identifiers. As the lexer detects tool-specific annotations in the character stream, it passes them to the back-end annotation processor. The back-end annotation processor is designed to lex and parse the annotations for a specific tool (or set of tools). In a system having a plurality of tools that use different tool-specific annotations, the back-end of the system will have a corresponding set of tool-specific annotation processors.

When the back-end annotation processor receives a tool-specific annotation from the lexer, the annotation processor generates an annotation token based upon the tool-specific annotation and returns the annotation token to the lexer. The lexer in turn adds the annotation token to the end of a list of tokens it has generated so far. The lexer passes the mixed stream of tokens, some generated within the lexer, and some generated by the back-end annotation processor, to the parser. The parser assembles the stream of tokens and annotation tokens into an abstract syntax tree and passes the tree to the aforementioned tool. The tool processes the annotation tokens as well as the other tokens in the abstract syntax tree.

In a preferred embodiment, at least one of the annotation processors has the capability of generating an annotation token that includes an abstract syntax tree within the annotation token. The abstract syntax tree within the annotation token may be referred to as a secondary abstract syntax tree and the abstract syntax tree assembled by the parser may be referred to as the primary abstract syntax tree. In this embodiment, the annotation token including a secondary abstract syntax tree is incorporated into the primary abstract tree in a context-sensitive manner by the parser.

In a preferred embodiment, an annotation processor includes an annotation lexer and an annotation parser. Preferably, the annotation lexer is context-free and the annotation parser is context-sensitive.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Consider a system that takes as input a computer program and processes the program in some way. Examples of such systems are compilers, type checkers, lint-like program checkers, extended static checkers, program verifiers, program documentation systems, and the like. The input computer program may be written in a standard programming-language, but the programming tool may need additional information provided by the programmer and specific to the tool.

Therefore, annotations can be defined for the tool. If the annotation language is defined as an extension of an existing programming-language, then one would want the implementation of the programming tool's parser to be defined as an extension of the parser for the standard programming-language, as much as possible.

Lexer, Parser, Streams, and Tokens

Figure 1:
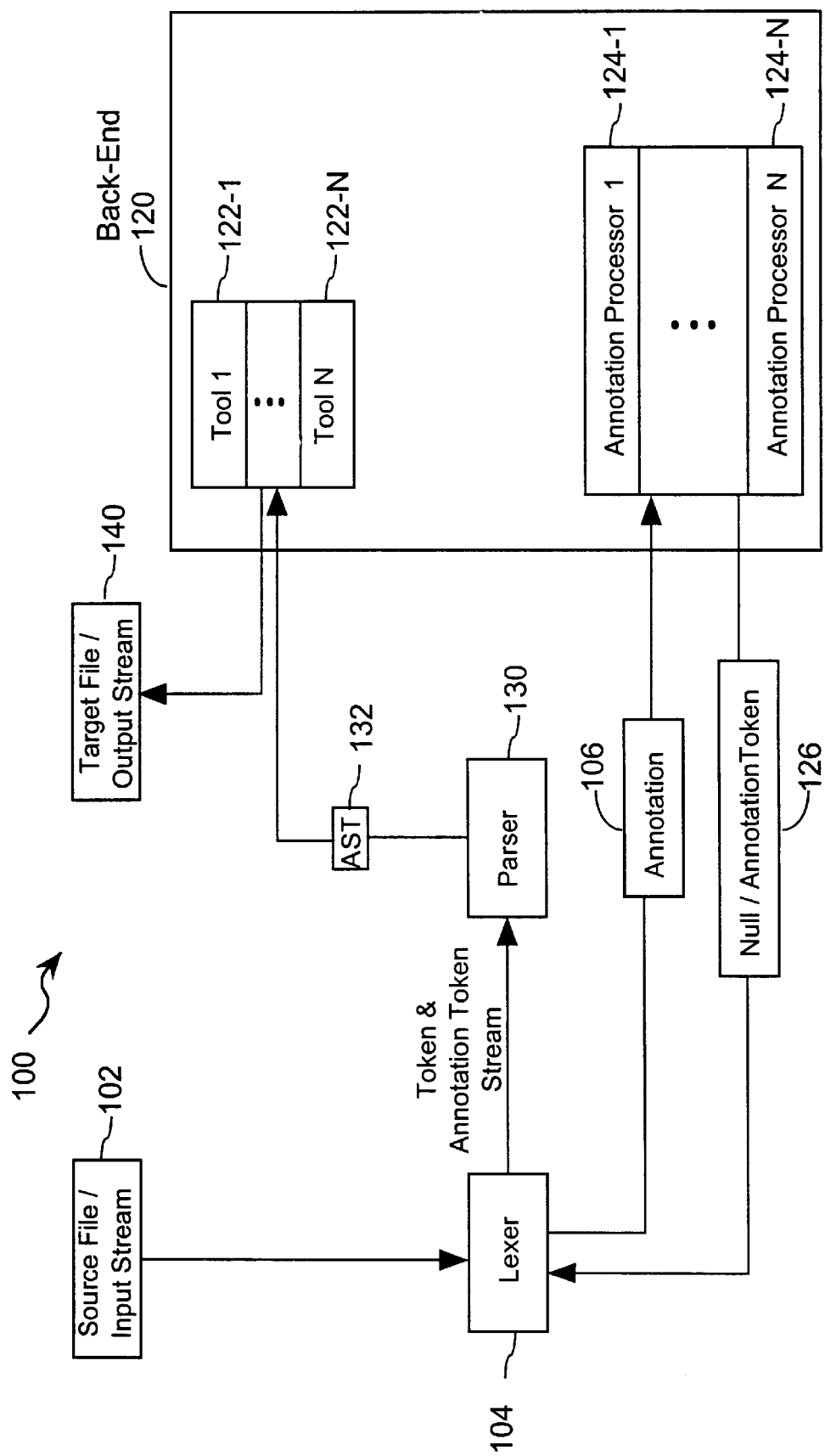
FIG. 1 is a flow chart of a method in accordance with the present invention.

FIG. 1 shows the data flow 100 of an implementation of a method that converts an input program into a data structure that a tool can then manipulate and analyze. A source file 102 is read by a lexer 104. Lexer 104 recognizes programming-language units in source file 102 and generates tokens representing these units. Lexer 104 also detects annotations in source file 102. When lexer 104 detects an annotation, it passes the annotation 106 to the back-end 120. In some implementations, the lexer 104 may recognize comments in the program, and may pass all comments to the back-end 120. Since the lexer 104 for any programming-language would normally already be coded to recognize comments, this implementation minimizes changes to the lexer 104. The lexer 104, instead of ignoring (and effectively discarding) program comments, passes them to the back-end 120.

Back-end 120 includes a plurality of annotation processors 124 and a corresponding set of tools 122. In some implementations, if two or more of the tools use identical sets of annotations, it is possible that one of the annotation processors will correspond to two or more of the tools.

Generally, the process of lexing and parsing a program is initiated when a user of the system requests a user-specified tool to process a user-specified program. All the tools 120 in the back-end are assumed, for the purposes of this explanation, to be tools used to process computer programs in one particular programming-language, such as C or C++ or Java (trademark of Sun Microsystems, Inc.). In accordance with the present invention, and unlike prior systems, the lexer 104 and parser 130 are generic to the programming-language for the specified program. That is, the same lexer and parser are used with all the tools 122. All tool-specific annotation handling is performed by the particular back-end annotation processor 124 that corresponds to the user-specified tool.

There are some circumstances in which a user may specify that a particular program is to be processed by two tools. For instance, the user may specify that a particular program is to be first processed by a compiler, and then if no errors are detected by the compiler, the program is to be processed by a documentation generator. Similarly, in some circumstances a first tool in the back-end may automatically invoke another tool in the back-end to process the AST either before or after the first tool. In these circumstances, the front-end, with the lexer and parser, only converts the program into an AST once, and thus only passes the annotations to one particular annotation processor. In such circumstances, it is assumed that either (A) both tools use the same annotations, or (B) that one or both tools include facilities for ignoring annotation tokens in the AST not applicable to that tool.

When back-end 120 receives annotation 106 from lexer 104, the annotation is sent to the annotation processor 124 for the user-specified tool. After processing the annotation into an annotation token, annotation processor 124 returns the annotation token 126 to lexer 104. If the annotation was a simple comment, including no applicable instructions for the user-specified tools 122, annotation processor 124 returns a NULL value to lexer 104. Lexer passes a stream of tokens, generated by lexer 104, and annotation tokens, generated by annotation processor 124, to parser 130. Parser 130 assembles the token and annotation token stream into an abstract syntax tree (AST) 132 according to the grammar of the programming-language in which the input source file 102 is written. In a preferred embodiment, the programming-language grammar used to write the input source file 102 is extended to include context-sensitive annotation slots. For example, a programming-language that includes the statement S::=Var X in S end may be extended to S::=Var X annotation in S end where annotation represents a slot where an annotation such as "Frequently Used" may be placed. Parser 130 passes AST 132 to back-end 120. The user-specified tool or tools 122 process the AST 132, including the annotation tokens therein, to produce target file 140.

Figure 2:
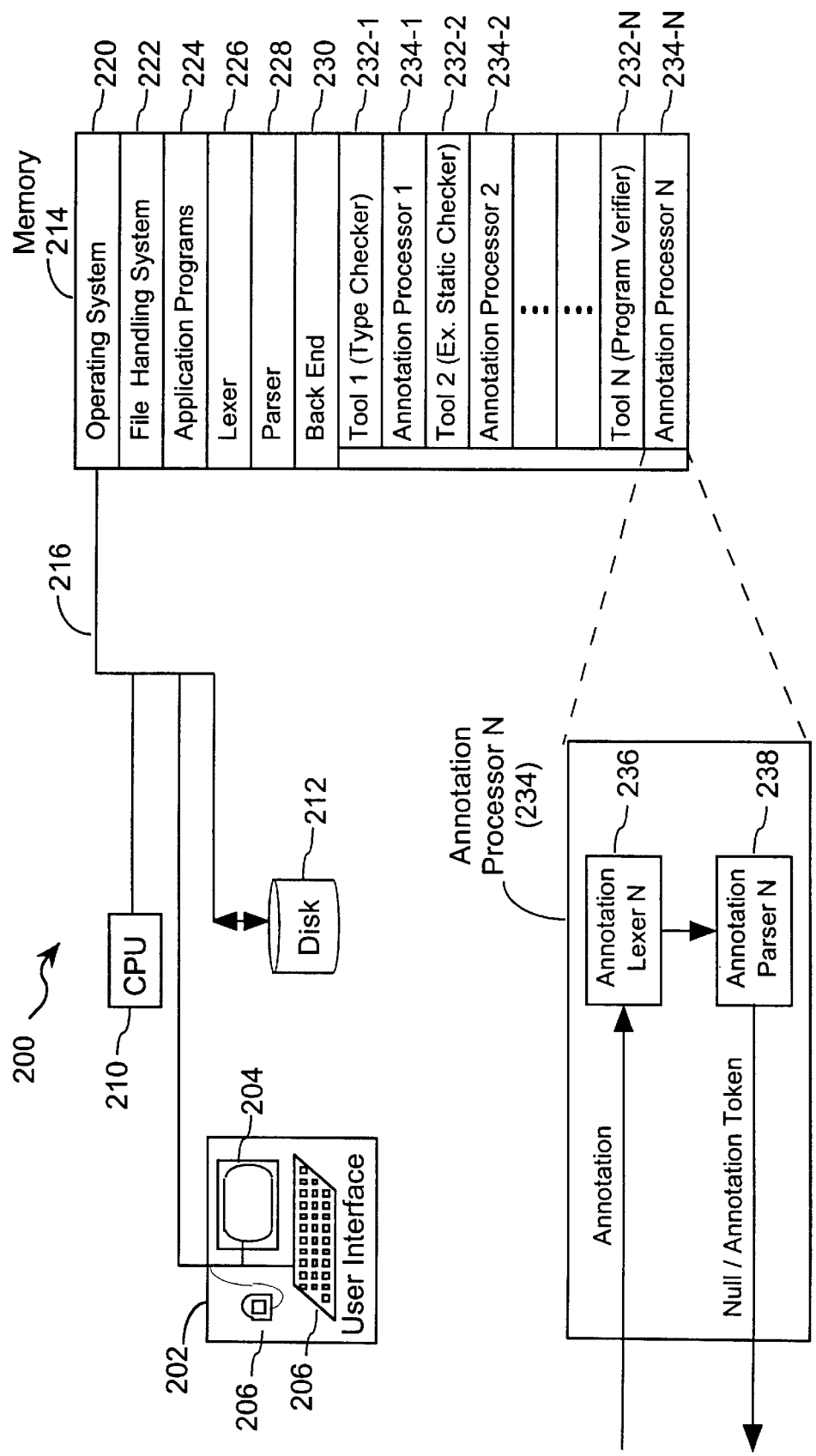
FIG. 2 is a block diagram of a system in accordance with the present invention.

FIG. 2 shows a system, such as system 200, in accordance with the present invention. The system preferably includes:

a user interface 202, including a display 204 and one or more input devices 206;

one or more central processing units 210;

a main non-volatile storage unit 212, preferably a hard disk drive, for storing source files (102 FIG. 1) and target files (140 FIG. 1);

a system memory unit 214, preferably including both high speed random-access memory (RAM) and read-only memory (ROM), for storing system control programs and application programs loaded from disk 212; and one or more internal buses 216 for interconnecting the aforementioned elements of the system.

The operation of system 200 is controlled primarily by control programs that are executed by the system's data processor 210. The system's control programs may be stored in system memory 214. In a typical implementation, the programs stored in the system memory 214 will include:

an operating system 220;

a file handling system 222;

one or more application programs 224;

a lexer 226;

a parser 228; and a back-end 230.

Back-end 230 includes one or more tools 232 and corresponding annotation processors 234. Each tool 232 processes specific components of an abstract syntax tree passed to back-end 230 by parser 228. As an illustration, a first tool 232 in back-end 230 may be a type checker, a second tool 232 may be an extended static checker, a third tool 232 may be a program verifier, and so forth. Conceptually, each of these tools has a corresponding annotation processor 234, but as indicated above, some tools may share a common annotation processor. In a preferred embodiment, at least one of the annotation processors 234 includes an annotation lexer 236 and an annotation parser 238.

As an example of how a source file is processed by a lexer and a parser to form an AST, consider a hypothetical programming-language with the following grammar:

```
Program ::= ExprA EOS        ;where EOS denotes end-of-stream
ExprA ::= ExprB "+" ExprA    ;addition, or,
        | ExprB "−" ExpA     ;subtraction
        | ExprB              ;
ExprB ::= Variable           ;variable value, or
        | Number             ;numeric value, or
        | "−" ExprB          ;unary minus, or
        | "(" ExprA ")"      ;parenthetical expression.
```

The tokens for this hypothetical language may be:

```
NUMBER(n)       ;where "n" denotes a non-negative integer
IDENTIFIER(s)   ;where "s" denotes a name
PLUS            ;addition operator ("+")
MINUS           ;subtraction operator ("−")
OPEN_PAREN      ;open parenthetical expression
CLOSE_PAREN:    ;close parenthetical expression, and
END_OF_STREAM   ;end of input stream
```

Every token in the hypothetical language has a label such as "NUMBER" or "PLUS," and some tokens also have a parameter value, such as an integer (n) or a string (s). Now consider a particular one line source file 102 (FIG. 1) written in the hypothetical language:

size +13

The stream of characters corresponding to this one line source file is:

"s" "i" "z" "e" " " "+" " " "1" "3" EOS

Referring to FIG. 1, lexer 104 converts this stream of characters into the following sequence of tokens:

IDENTIFIER ("size") PLUS NUMBER(13)END_OF_STREAM

Figures 3A, 3B:
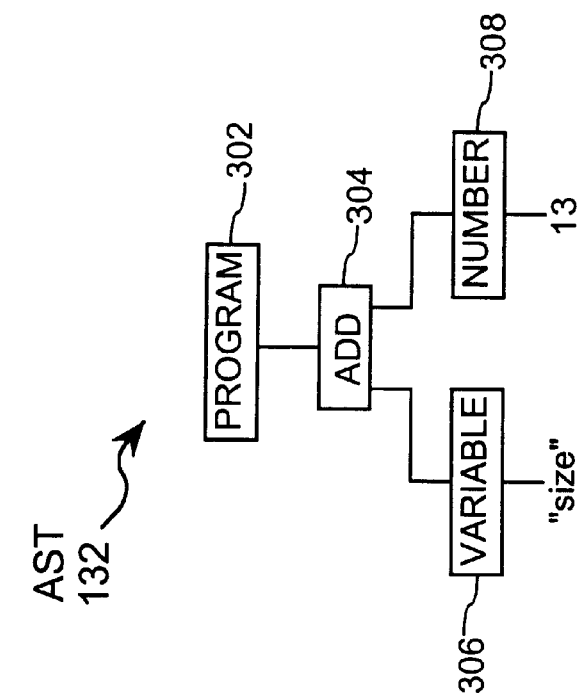
FIGS. 3A and 3C are examples of parse trees.
FIG. 3B is the AST representation of FIG. 3A

The parser 130 (FIG. 1) then conceptually generates parse tree 300 (shown in FIG. 3A) from these tokens. In practice, the parser actually generates the AST data structure 132 shown in FIG. 3B. In a preferred embodiment AST 132 does not contain unneeded and redundant information present in parse tree 300. In FIG. 3B, AST includes a program node 302, node 304 for the addition expression, a node 306 for the variable "size", and a node 308 for the number "13."

As another example, consider a second one line source file written in the hypothetical language described above:

−x−5

Figure 3D:
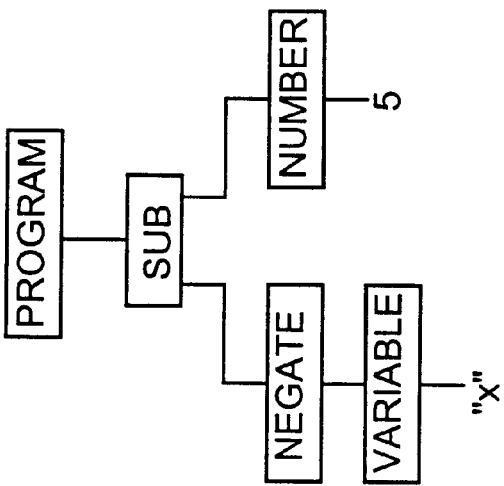
FIG. 3D is the AST representation of FIG. 3C.
Figure 3C:
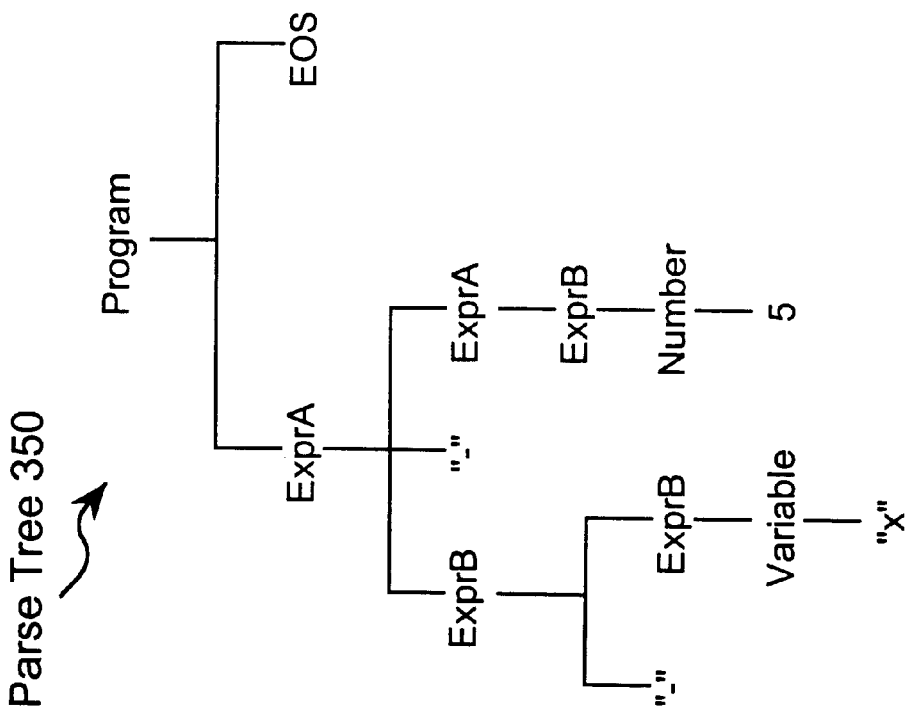

The sequence of tokens corresponding to this second one line source file is:

MINUS IDENTIFIER("x") MINUS NUMBER(5) END_OF_STREAM, which is converted by parser 130 (FIG. 1) into parse tree 350 and AST 132 shown in FIGS. 3C and 3D, respectively. In this example, lexer 104 converts any occurrence of the character "−" into the token MINUS, however, the parser 130 may interpret MINUS either as a unary minus operator negation or as the binary subtraction operator depending on which tokens precede or follow the MINUS token. In this sense, parser 130 is context-sensitive whereas lexer 104 is context-free.

Comments and Whitespace

Note that in the two examples above, lexer 104 does not produce any tokens for the " " (whitespace) characters of source file 102. Most modern programming-languages are designed in that way. In fact, most languages also allow the program to include "comments" that the programmer writes to document the source program. A standard lexer 104 also ignores comments, and therefore, comments are never processed by parser 130. This has the advantage that a programmer can include whitespace and comments anywhere in the program, as long as a comment or whitespace is not inserted inside consecutive characters that make up a token. It also means that the grammar for a programming-language need not specify all places where comments or whitespace can be placed.

Comments are usually delimited by a sequence of characters that begin the comment, and a sequence of characters that end the comment. For example, in the programming-languages C++ and Java, a comment can begin with the characters "/*" and end with the characters "*/".

Thus, if a lexer for Java detects the character "/*" followed by the character "*" in a source file, the lexer (assuming that it does not incorporate the present invention) will ignore all following characters up until the next consecutive occurrence of the characters "*" and "/".

Annotations

Referring to FIG. 1, annotations are used by tools 122. Each tool 122 may have a set of annotations that it recognizes and supports. The annotations are placed in the source file along with the programming-language statements. A standard lexer, one that does not incorporate the present invention, treats the annotations as comments and does not process them. However, in accordance with the present invention the lexer 104 is modified to either (A) send all comments to an annotation processor 124 for processing, or (B) recognize the beginning of a string in a comment that appears to represent an annotation, and pass that string to the annotation processor 124.

As indicated earlier, each tool 122 (FIG. 1) in the back-end 120 may use a different set of annotations than the other tools. If a program (source file) contains annotations for use with more than one tool, it may contain annotations not recognized by the user-specified tool. Stated in another way, each tool 122 only processes the annotations that belong to the set of annotations recognized by the particular tool 122. Each tool 122 is preferably coded to ignore annotations in the AST that are not supported by the tool. Furthermore, each annotation processor 124 is preferably coded to return NULL values to the lexer 104 for annotations that are not supported by the corresponding tool 122.

As a simple way to define which comments are to be interpreted as annotations, the annotation language of a tool 122 may say that any comment whose first character is the character "@" is an annotation. Thus, for example, the input program fragment:

"/* this is a comment */"

would be considered a comment that is ignored whereas the input program fragment:

"/*@ this is an annotation */"

would be considered an annotation. One of skill in the art will recognize that there are many schemes, in addition to the /*@*/ example described above, for distinguishing annotations, which are processed by an annotation processor, and comments, which are simply ignored.

The following are examples of annotations that are useful in particular tools 122:

/*@ NON_NULL*/
/*@ FREQUENTLY_USED */
/*@ EVEN */
/*@ INVARIANT x<y+10*/
/*@ This is a comment used in some special way by a program documentation system */
/*@ DEPENDS a[t: T] ON c[t] */

In most systems, each tool that uses annotations has a custom designed lexer and parser that are used only with that tool. As discussed above, in the present invention the lexer 104 and parser 130 are generic and are used with all the tools (or at least a set of several tools) for processing programs written in a particular programming-language. When new tools are developed, or new types of annotations are developed for an existing tool, the lexer 104 and parser 130 remain unchanged, since annotation lexing and parsing has been compartmentalized and delegated to the annotation processors 124.

Annotation Tokens

Referring to FIG. 1, the present invention introduces the concept of a "annotation token." An annotation token is like a token in that it has a label and can be passed by lexer 104 to parser 130. An annotation token is distinguished from other tokens in that its parameter value is not only capable of being a simple integer or string, but also a more complex structure, for example, an abstract syntax tree.

Furthermore, the structure of the annotation token is not defined by the lexer 104 or parser 130, but rather by a specific tool 122. That is, the lexer 104 never "looks inside" an annotation token, and is not dependent upon the internal structure of the annotation token. This lets the lexer 104 remain independent of the tools 122.

Generating Annotation Tokens

As mentioned above, when lexer 104 detects an annotation (or a comment that might contain an annotation), it passes the annotation to an annotation processor 124. Annotation processor 124 takes annotations 106 as input and returns annotation tokens 126 to the lexer. Lexer 104 passes the annotation tokens received from annotation processor 124 to parser 130.

FIG. 2 shows the details of one embodiment of an annotation processor 234 (124 FIG. 1). An annotation lexer 236 receives an annotation from the lexer 226. The annotation lexer determines the lexical content of the annotation and passes one or more tokens to annotation parser 238. Annotation parser 238 generates an annotation token based upon the tokens passed to it by the annotation lexer 236. This annotation token is then returned to lexer 226.

Note, with this structure, lexer 226 (104 FIG. 1) does not need to know all possible annotation tokens that can be returned by annotation processor 234. Lexer 226 simply passes the annotation tokens to parser 228 as it would any other token.

In some embodiments, the annotation processor 124 for some tools may have a combined lexer and parser. This combined lexer/parser is preferred when all annotations defined for the tool are extremely simple in structure, each annotation typically consisting of a label or a label and one or two parameters. For more complex annotations, the separate lexer and parser arrangement shown in FIG. 2 is preferred.

The present invention works most cleanly when the annotation processor 124 is context-free. That is, the annotation processor 124 produces annotation tokens according to the given annotation 106, without regard to where in the source file 102 the annotations 106 occur.

Although the annotation processor 124 is preferably context-free, the context of the annotation in source file 102 may have meaning because the context of the annotation in source file 102 will affect how an annotation token 126, corresponding to the annotation 106, is assembled into AST 132 by parser 130 and processed by tools 122. Put more simply, the position of each annotation token in the sequence of tokens sent by the lexer 104 to the parser 130 will provide context information for the annotation.

As a simple example, consider a programming-language whose syntax is given by the following grammar:

| Program | ::= Statements EOS |
|---|---|
| Statements | ::= Statement ";" Statements |
| |   | Statement |
| Statement | ::= "VAR" Variable "IN" Statements "END" |
| |   | Variable ":=" Expr    ;variable assignment |
| Expr | ::= Number    ;numeric value, or |
| |   | Variable    ;variable value |
| |   | Expr "+" Expr    ;addition |

Now, consider a simple example in which a tool 122 allows a variable declaration to be annotated to, for example, indicate that the variable declared is frequently used, and that allows an assignment to be annotated to indicate that the numeric value assigned to the variable is even or will be frequently used in the rest of the program, or both even and frequently used.

To allow the use of such annotations, the portion of the grammar for the programming-language for defining a Statement, where G* denotes any number of occurrences of G's (including none), is modified to read as follows:

| Statement | ::= "VAR" Annotation* Variable "IN" Statements "END" |
|---|---|
| |   | Annotation* Variable ":=" Expr |
| Annotation | ::= FrequentlyUsed | Even | where FrequentlyUsed and Even denote the respective annotations.

Using our invention, the precise grammar for annotations is known only to the tool-specific annotation processor 234 (FIG. 2); the non-tool specific lexer 226 and parser 228 treat Annotation as denoting any annotation (token). We allow multiple annotations for a given statement to allow a variable to be declared both frequently used and even. It is the job of the tool 122 (FIG. 1) to disallow the use of an Even annotation on a variable declaration. Note that this factoring of the grammar allows us to change the set of legal annotations later without changing the non-tool specific lexer 226 and parser 228 so long as the new annotations can only appear in the same places as the old annotations.

In accordance with the programming-language grammar specified above, the tokens that can be returned by the lexer are:

NUMBER(n)
IDENTIFIER(s)
PLUS
VAR
IN
END
BECOMES ;the token for":="
SEMICOLON
END_OF_STREAM, and the forms of annotation tokens that the annotation processor (and thus also the lexer) can return are:

ANNOTATION_TOKEN(FREQUENTLY_USED)
ANNOTATION_TOKEN(EVEN)

Thus, consider the following annotated program that is written in the programming-language defined above:

VAR x IN
  x=5;
  VAR /*@ FREQUENTLY_USED */ y IN
    y :=x+3;
    /*@EVEN*/ y :=y+2;
    /*@ FREQUENTLY_USED */ x :=1;
    y :=y+x+y+x+y+x
  END
END

The lexer 104, after returning the second VAR token and upon recognizing the characters "/*@", will generate a substream consisting of the following characters:

"F" "R" "E" "Q" "U" "E" "N" "T" "L" "Y" "_"

"U" "S" "E" "D" " " EOS

This substream is sent by the lexer 104 to the annotation processor 124. The annotation processor 124 will then produce the following annotation token:

ANNOTATION_TOKEN(FREQUENTLY USED)

This annotation is returned by the annotation processor 124 to lexer 104, and lexer 104 passes it on to parser 130.

After lexer 104 reaches the second FREQUENTLY_USED annotation, lexer 104 will pass a substream also consisting of the characters above to the annotation processor 124, which will again return:

ANNOTATION_TOKEN(FREQUENTLY USED).

It is noted that the same annotation token is returned, even though the parser 130 will use the annotation token in different ways in these two cases. The first FREQUENTLY_USED annotation applies to a variable that is declared, whereas the second annotation applies to the result of an assignment statement. Accordingly, the two FREQUENTLY_USED annotations are assembled by the parser 130 into the AST tree in a context-sensitive manner and processed by a tool that supports the FREQUENTLY-USED annotation.

Figure 4B:
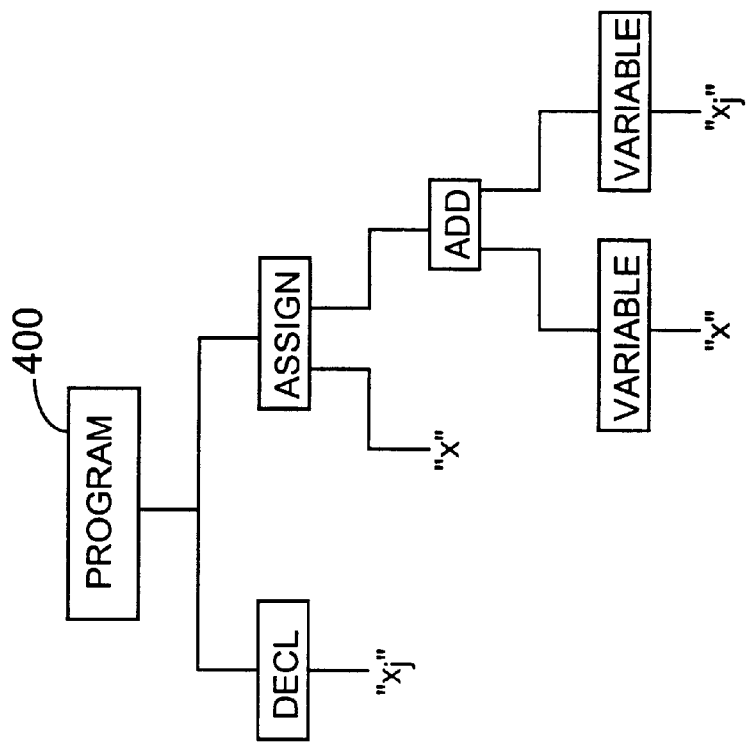
FIG. 4A is an example of an annotation token and FIGS. 4B and 4C provide examples of how an annotation token is incorporated into an abstract syntax tree.
Figure 4A:
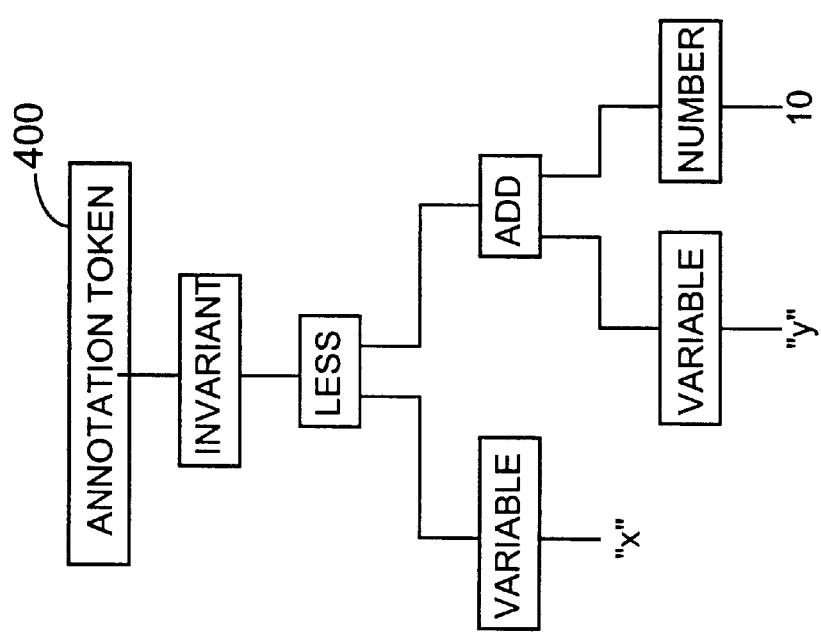

In the example above, annotation processor 124 is quite simple. In general, however, annotation processor 124 may construct more complex annotation tokens. For example, to create an annotation token for the INVARIANT annotation:

/*@ INVARIANT x<y+10*/ the annotation processor must parse the expression that follows the keyword INVARIANT to generate the annotation token depicted in FIG. 4A. More specifically, for tools using complex annotations of this type, the annotation processor will preferably include a lexer 236 (FIG. 2) that converts the annotation text into a sequence of tokens, and a parser 238 that assembles the tokens into an abstract syntax tree in accordance with the grammar of the "annotation language" for the tool.

Even a complex annotation token such as that depicted in FIG. 4A is not processed by lexer 104 (FIG. 1) or parser 130. Rather, parser 130 assembles the annotation token into an AST without "looking inside" the annotation token. Then, when the parser passes the AST to the back-end, a tool capable of processing the INVARIANT annotation analyzes the token depicted in FIG. 4A.

Tools may support annotations that are highly complex mathematical formulas. For example, a tool may support the annotation:

/*@ x=quad(a,b,c) */.

In such an example, lexer 104, noting the /*@ */ structure, will pass the annotation to an annotation processor 124. An annotation processor that supports the quadratic function will then generate an abstract syntax tree in accordance with the quadratic equation:

$$x = \frac{-b \pm \sqrt{b^2 - 4ac}}{2a}.$$

For tools that utilize complex annotation tokens, preferred embodiments of the annotation processor include an annotation lexer and an annotation parser.

EXAMPLES

The advantage of the system and methods of the present convention can further be illustrated by considering the following examples.

Example 1

Consider the hypothetical programming-language:

P ::= ε | S ";" P
S ::= ε
   | "var" X
   | X "=" E
   | "if" E "then" $S_1$ "else" $S_2$
E ::= X
   | $E_1$ "+" $E_2$
   | $E_1$ "−" $E_2$
   | $E_1$ "÷" $E_2$
   | $E_1$ "*" $E_2$ where ε represents a null element and X represents a variable name such as x. Now consider the following two-line program written in the hypothetical programming-language:

var $x_j$;

x=x+$x_j$;

A parser will build the AST depicted in FIG. 4B. Now, suppose that we desire to change the programming-language to support context-sensitive annotations such as:

var x annotation; and annotation;

These annotations are context-sensitive in the sense that in the first case they apply to the variable immediately preceding them and in the second case they act as a new kind of statement. Such annotations may be used to convey special meaning to a back-end tool such as an error-checker. For example, the annotation "/*@ non__null */" when placed in a variable declaration might mean that the declared variable should never be assigned a null value, and the annotation "/*@ assert x>0*/" placed where a statement could go might instruct the error checker to make sure that when the program reaches that point in the program that x is greater than 0.

```
P ::= ε | S ";" P
S ::= ε
    | Annotation
    | "var" X Annotation*;
    | X "=" E
    | "if" E "then" S₁ "else" S₂
E ::= X
    | E₁ "+" E₂
    | E₁ "−" E₂
    | E₁ "÷" E₂
    | E₁ "*" E₂
```

Figure 4C:
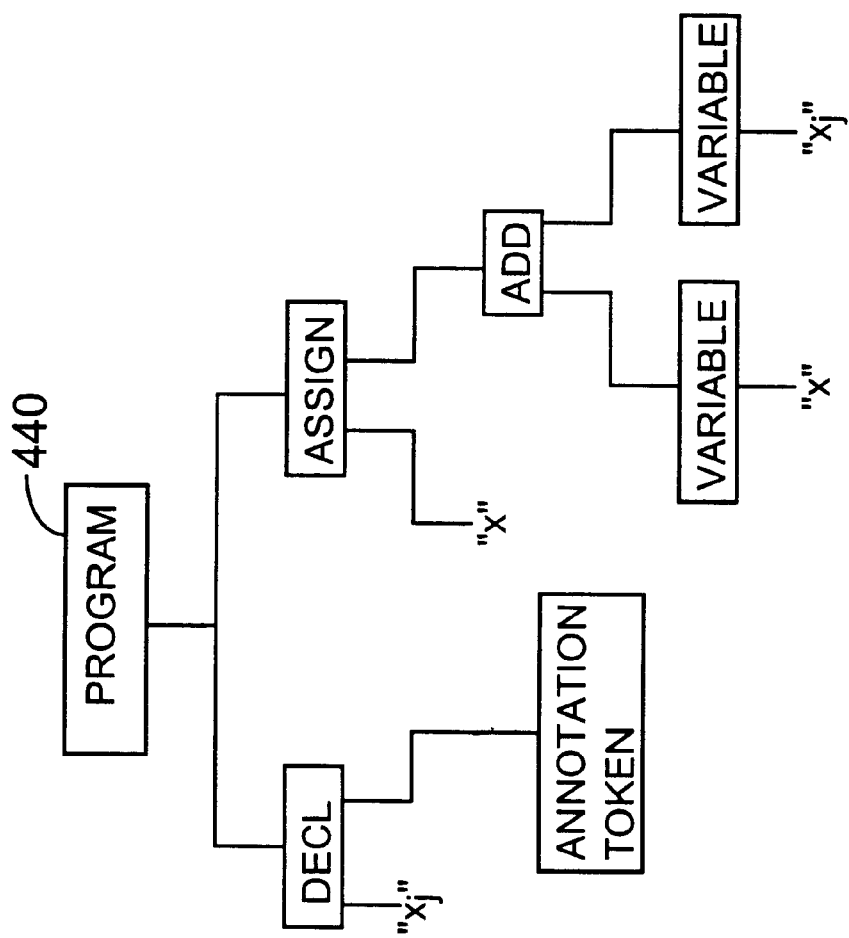

The two-line program written in the hypothetical programming-language may then read:

var x$_j$ annotation;

x=x+x$_j$;

When the lexer detects the annotation, it will send it to the appropriate annotation processor. The annotation processor will generate an annotation token and return the annotation token to the lexer. The lexer will pass the annotation token along with the tokens generated by the lexer to the parser. The parser will then generate the AST depicted in FIG. 4C. The annotation token assembled into the AST by the parser will not be processed until the AST is passed to the appropriate tool. Thus, the lexer need only be recoded to the extent that it distinguishes "annotations" from comments in order to support the newly modified hypothetical language.

Example 2

In practice, each type of annotation often makes sense only when placed in certain annotation slots of the modified programming-language grammar. For example, the non__null annotation is meaningless when used as a statement and since assert annotations act like statements, it doesn't make much sense to allow them to be attached to variable declarations. While tool 122 can scan an AST and complain about ill-placed annotations, it is easier, in such cases, to put the information about where annotations can occur directly in the non-tool specific grammar. For example:

```
P ::= ε | S ";" P
S ::= ε
    | StatementAnnotation
    | "var" X DeclAnnotation*;
    | X "=" E
    | "if" E "then" S₁ "else" S₂
```

-continued

```
E ::= X
    | E₁ "+" E₂
    | E₁ "−" E₂
    | E₁ "÷" E₂
    | E₁ "*" E₂
```

Here, we have divided up the set of possible annotations into those that may be attached to variable declarations (DeclAnnotations) and those can may be used like statements (StatementAnnotations).

To handle this, annotation tokens now contain information about what kind they are (DeclAnnotation or StatementAnnotation). The non-tool specific lexer 104 works as before. The non-tool specific parser 130 is modified to use this kind information when generating parse trees. It ignores all other information in annotation tokens. This means that we may change the set of annotations in any way without changing the non-tool-specific lexer 226 or parser 228 so long as every annotation can appear only either where DeclAnnotation appears in the grammar or where StatementAnnotation appears in the grammar. For most programming languages, given a reasonable choice of grammar slots, this limitation is seldom an issue. Putting information about the kinds of annotations into the grammar also has the advantage of making the parser's job easier because it may need to do less lookahead to determine what it is seeing; the kind information may also enable the parser to produce better error messages.

Example 3

Figures 5A, 5B:
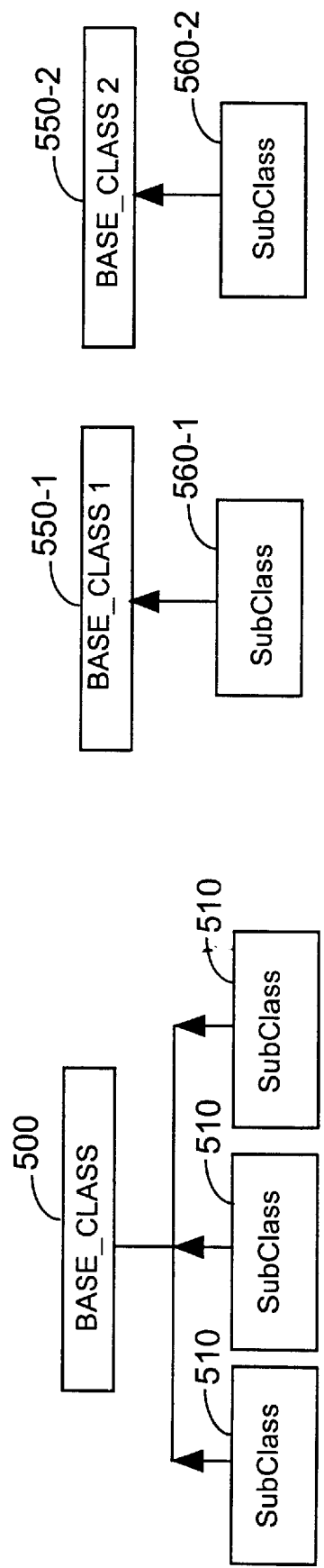
FIGS. 5A and 5B are examples of annotation classes.

The system and method of the present invention is particularly advantageous when annotations are represented as objected-oriented classes. Referring to FIG. 5A, consider a particular tool that represents annotations as subclasses 510 of a class named BASE__CLASS 500. Because subclasses can be used anywhere a superclass is required, this means that the lexer 104 and parser 130 need deal with annotation tokens only of type BASE__CLASS. Moreover, if new annotations are added later that require new classes, we can avoid having to make any change to the original lexer and parser by making the new classes subclasses of BASE__CLASS.

Referring to FIG. 5B, in some embodiments, the original lexer may be designed to recognize multiple kinds of annotations (e.g., example 2). In this case, it is most advantageous to have a separate base class 550 for each kind of annotation. Thus, for example, all annotations of variable declarations might be subclasses of BASE__CLASS 1 and all stand-alone statement annotations might be subclasses of BASE__CLASS 2. Here, the lexer 104 and parser 130 need deal with annotation tokens only of types BASE__CLASS 1 and BASE__CLASS 2. This means that they do not need to be changed as new annotation subclasses are added to the two base classes.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

What is claimed is:

1. A system for parsing annotations in a character stream representing a source program written in a computer programming-language, comprising:

a central processing unit;

a memory;

at least one bus connecting the central processing unit and the memory;

the memory storing a lexer, a back-end, and a parser:

the lexer for generating tokens based upon the programming-language statements present in the character stream, detecting the annotations of the character stream, passing the detected annotations to the back-end, receiving annotation tokens from the back-end, and passing both the tokens and the annotation tokens to the parser;

the back-end including a plurality of annotation processors, for processing annotations received from the lexer into annotation tokens, and a plurality of tools, for processing a primary abstract syntax tree received from the parser; wherein, for each annotation processor in the plurality of annotation processors, there is a corresponding tool in the plurality of tools; and the parser for receiving tokens and annotation tokens from the lexer and assembling the tokens and the annotation tokens into the primary abstract syntax tree, and for passing the assembled primary abstract syntax tree to the back-end.

2. The system of claim 1 wherein the annotations are context-sensitive, and the annotation processors process the annotations into annotation tokens without respect to context of the annotations.

3. The system of claim 1, wherein at least one of the annotation tokens includes a secondary abstract syntax tree and the parser is further configured to assemble the secondary abstract syntax tree into the primary abstract syntax tree.

4. The system of claim 1, wherein the annotation processor includes an annotation lexer that is context-free, and an annotation parser that is context-sensitive.

5. A method for parsing annotations in a character stream representing a source program written in a computer programming-language, comprising:

in a lexer for a predefined computer programming-language, converting computer programming-language statements present in the character stream into tokens;

detecting annotations in the character stream;

passing the annotations to an annotation processor that is selected from a plurality of annotation processors;

receiving annotation tokens from the annotation processor passing the tokens and annotation tokens to a parser;

in the selected annotation processor, converting the annotations into the annotation tokens;

in the parser, assembling the tokens and annotation tokens into a primary abstract syntax tree;

passing the primary abstract syntax tree to a tool, selected from a plurality of tools, the selected tool corresponding to the selected annotation processor; and in the selected tool, processing the primary abstract syntax tree.

6. The method of claim 5, wherein the annotations are context-sensitive; and the selected annotation processor processes the annotations into annotation tokens without respect to context of the annotations.

7. The method of claim 5, wherein at least one of the annotation tokens includes a secondary abstract syntax tree and the parser assembles the secondary abstract syntax tree into the primary abstract syntax tree.

8. The method of claim 5 wherein the annotation processor includes an annotation lexer that is context-free, and an annotation parser that is context-sensitive.

9. A computer program product for use in conjunction with a computer controlled system, the computer program product comprising a computer readable storage medium and a computer program mechanism embedded therein, the computer program mechanism comprising:

a lexer for generating tokens based upon the programming-language statements present in the character stream, detecting the annotations of the character stream, passing the detected annotations to a back-end, receiving annotation tokens from the back-end, and passing both the tokens and the annotation tokens to a parser;

the back-end including a plurality of annotation processors, for processing annotations received from the lexer into annotation tokens, and a plurality of tools, for processing a primary abstract syntax tree received from the parser; wherein, for each annotation processor in the plurality of annotation processors, there is a corresponding tool in the plurality of tools;

the parser for receiving tokens and annotation tokens from the lexer and assembling the tokens and the annotation tokens into the primary abstract syntax tree, and for passing the assembled primary abstract syntax tree to the back-end.

10. The computer program product of claim 9 wherein:

the annotations are context-sensitive, and the annotation processors process the annotations into annotation tokens without respect to context of the annotations.

11. The computer program product of claim 9, wherein at least one of the annotation tokens includes a secondary abstract syntax tree and the parser is further configured to assemble the secondary abstract syntax tree into the primary abstract syntax tree.

12. The computer program product of claim 9, wherein the annotation processor includes an annotation lexer which is context-free, and an annotation parser which is context-sensitive.

* * * * *